United States Patent

[11] 3,607,508

| [72] | Inventor | Edward Ha, Jr.<br>49-721 Kam Hwy., Star Route Box 470,<br>Kaaawa, Hawaii 96730 |
|---|---|---|
| [21] | Appl. No. | 832,331 |
| [22] | Filed | June 11, 1969 |
| [45] | Patented | Sept. 21, 1971 |

[54] METHOD OF PRODUCING AN ORNAMENTAL GARLAND
10 Claims, 6 Drawing Figs.

[52] U.S. Cl. .................................................. 156/159,
156/61, 156/372, 161/15
[51] Int. Cl. ............................................... B31f 5/00
[50] Field of Search .......................................... 156/159,
264, 266, 296, 322, 69; 161/16, 15

[56] References Cited
UNITED STATES PATENTS
2,514,197   7/1950   Groten et al. ................. 156/158
3,046,685   7/1962   Blum ............................. 161/15
3,110,647   11/1963  Tong ............................. 161/15 X
3,117,903   1/1964   Hix ............................... 156/158

*Primary Examiner*—Carl D. Quarforth
*Assistant Examiner*—E. E. Lehmann
*Attorney*—Webster & Webster ABSTRACT: A method of producing an ornamental garland comprised of a row of tubular-necked flowers strung on a length of filament as, for example, in the manufacture of a lei; the method including the steps—repetitive in progression along the filament—of severing the filament at a point adjacent one flower previously strung thereon, the severed filament then providing one portion with said one flower thereon and a separate portion, stringing another flower on said separate portion of the filament, and then connecting said portions of the filament at their severed ends and in a fashion to produce an enlargement which—as a stop—limits movement of such other flower toward said one flower.

PATENTED SEP 21 1971

INVENTOR.
Edward Ha, Jr.
BY
Webster & Webster
ATTYS.

3,607,508

METHOD OF PRODUCING AN ORNAMENTAL GARLAND

BACKGROUND OF THE INVENTION

In the manufacture of an ornamental garland, such as a lei, which includes a plurality of tubular-necked flowers strung on a length of filament, there is a tendency for the flowers to slide on the filament and to bunch or crowd together thereon. In an endless lei, as worn about and draped from the neck, the flowers tend to gravitate toward the lower part of the lei, with the aforementioned undesirable bunching or crowding together. It is in contemplation of this problem that the present invention was conceived.

SUMMARY OF THE INVENTION

The present invention provides, as a major object, a novel method of producing an ornamental garland comprising a length of filament and a plurality of tubular-necked flowers strung thereon in symmetrically spaced array; the method, as practiced, resulting in the forming of an enlargement on the filament between adjacent flowers, and such enlargements—acting as stops—limiting movement of the flowers on the filament whereby to preclude the aforesaid undesirable bunching or crowding together of such flowers on said filament.

The present invention provides, as another object, a novel method, as in the preceding paragraph, which includes the steps—repetitive in progression along the filament—of severing the filament at a point adjacent one flower previously strung thereon, the severed filament then providing one portion with said one flower thereon and a separate portion, stringing another flower on said separate portion of the filament, and then connecting said portions of the filament at their severed ends and in a fashion to produce one of such enlargements.

The present invention provides, as an additional object, a novel method, as above, in which the severed ends of the filament (which is preferably of nylon or the like) are connected by first heating and melting such ends to produce semifluid globules and then merging such globules to create a weld in the form of a knoblike enlargement which serves the described purpose.

The present invention provides, as a further object, a method of producing an ornamental garland which is designed for ease and economy of manufacture.

The present invention provides, as a still further object, a practical, reliable, and durable method of producing an ornamental garland and one which is exceedingly effective for the purpose for which it is designed.

DESCRIPTION OF THE PREFERRED EMBODIMENT

Figure 1:
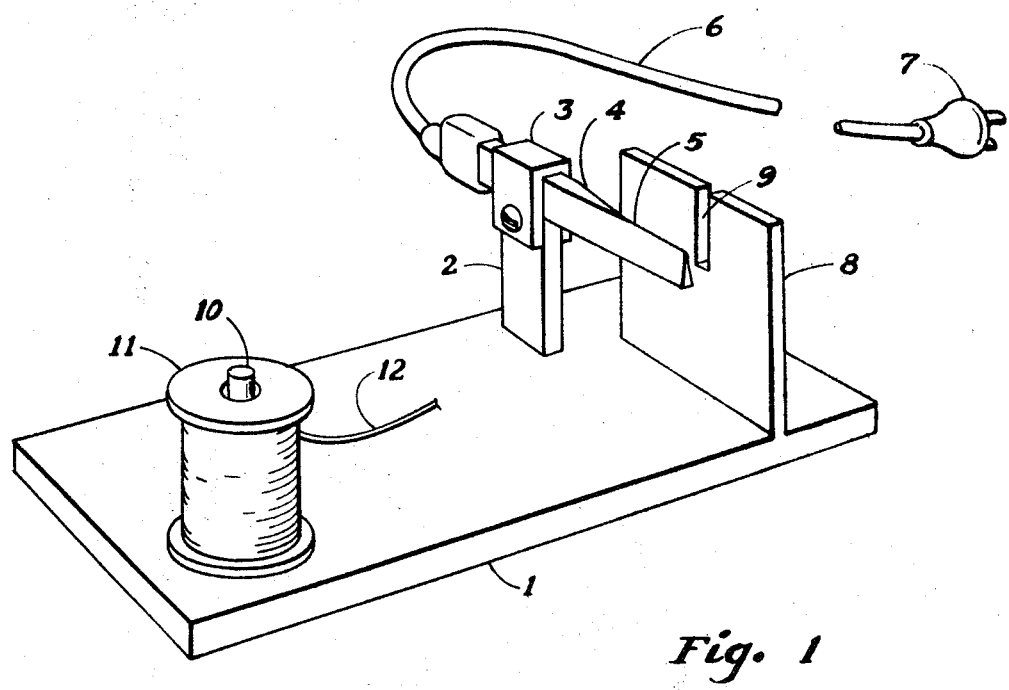
FIG. 1 is a perspective view of one form of device which may be employed in the manual practice of the method.
Figure 2:
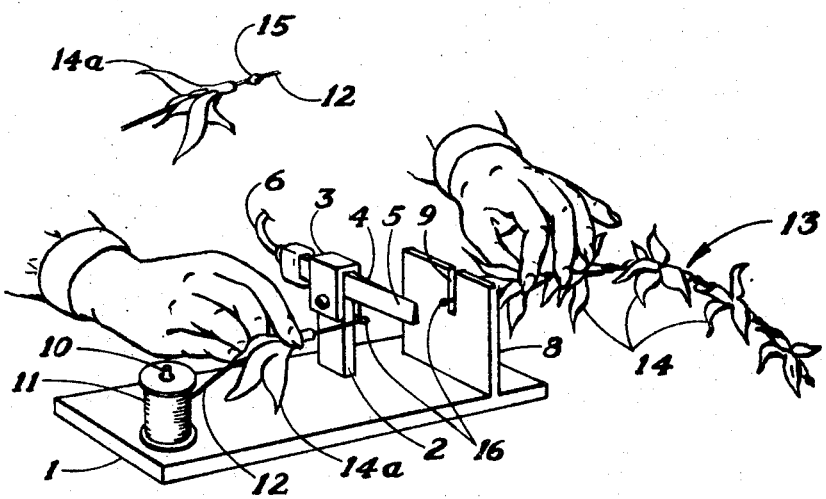
FIG. 2 is a perspective view, on reduced scale, showing the next-to-the-last step of each cycle of the method; the view including, in a detached fragmentary illustration of the filament, the formation—as a last step—of one of the knoblike enlargements.

Referring now more particularly to the drawings and to the characters of reference marked thereon, one form of device which may be employed in the manual practice of the method is shown in FIGS. 1 and 2 and in part in the remaining figures of the drawings; such device comprising the following:

A flat elongated base 1 is provided adjacent but short of one end thereof with an upstanding post 2 which, by means of a yoke 3, is fitted at the top with a transversely extending, electric iron 4 (in the general nature of an electric soldering iron) which includes a heated blade 5 disposed horizontally in spaced relation above the base. The electric iron 4 also includes a cord 6 having a plug 7 adapted for engagement in a conventional electrical outlet.

Between the blade 5 and the near end of the base 1, the latter supports a fixed, upstanding heat shield 8 of suitable material; the shield 8 facing but being spaced from said blade 5. In a longitudinal plane extending between the ends of blade 5, the heat shield 8 is formed with a vertical slot 9 whose lower end is lower than such blade, while the upper end is open.

Adjacent the other end of the base 1 and spaced beyond the blade 5 in a direction opposite the heat shield 8, the base has an upstanding spindle 10 fixed hereon; such spindle being surrounded in turnable relation by a vertical axis spool 11 containing a quantity of filament 12 (such as nylon monofilament).

The garland, here shown in a finished portion indicated generally at 13, comprises a plurality of tubular-necked flowers 14 (such as orchids) strung in adjacent but equally spaced relation on the filament 12 with individual enlargements 15 (hereinafter recited as knobs) formed on the filament between adjacent flowers. These knobs 15 are of a size larger than the inside diameter of the tubular necks of the flowers, and hence such knobs act as stops which maintain the initial and desired spacing of the flowers on the filament.

The method of producing such ornamental garland comprises, in repetitive progression along the length of the garland, the following steps:

For the purpose of this description, let it be assumed—as shown at 13—that a portion of the garland has already been produced, and that the filament 12 runs unbroken from the spool 11 to such finished-garland portion.

Figure 3:
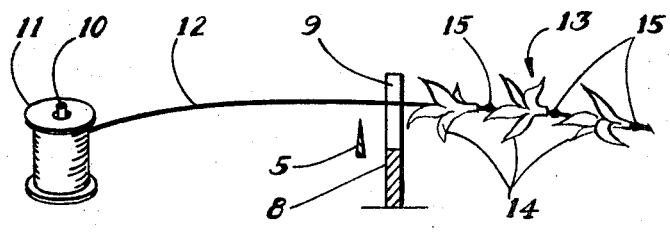
FIG. 3 is a diagrammatic showing of the initial step of the method; i.e. positioning the filament for cutting.

To form the next knob and apply the next flower to the garland, the operator, grasping the filament at longitudinally spaced points, first disposes it in a position spanning in spaced relation above the heated blade 5 but extending through the slot 9, with the last-applied flower (in protected relation) adjacent but outwardly of the heat shield 8, as shown in FIG. 3.

Figure 4:
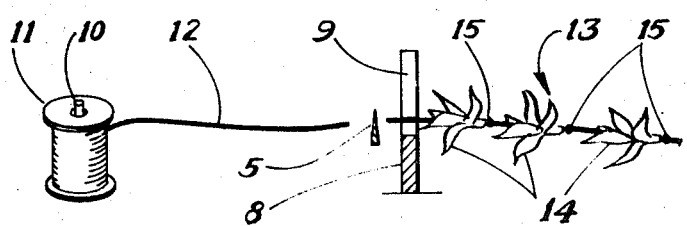
FIG. 4 is a diagrammatic showing of the second step; i.e. the cutting of the filament.
Figure 5:
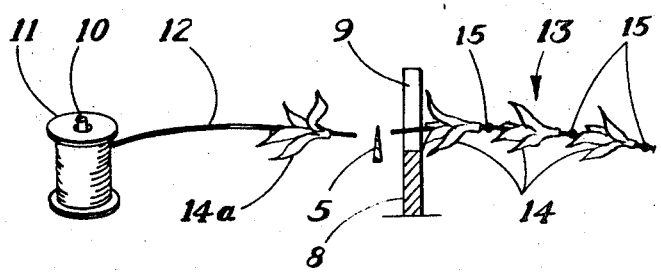
FIG. 5 is a diagrammatic showing of the third step; i.e. the threading of the next flower.

Nextly, the filament 12 is lowered into engagement with, and severed into separate portions by, the heated blade, as shown in FIG. 4; this being followed by the threading, as shown in FIG. 5, of the next flower 14a on that portion of the severed filament which runs from the spool 11.

Figure 6:
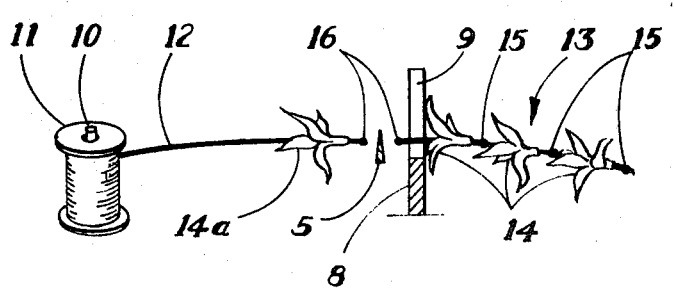
FIG. 6 (as in FIG. 2) is a diagrammatic showing of the fourth and next-to-the-last step; i.e. the heating and melting of adjacent severed ends of the filament to produce semifluid globules preparatory to merging them as a weld in the form of a knoblike enlargement.

Thereafter, the ends of such severed portions of the filament 12 (which is of a material—such as nylon—rendered plastic by heat) are simultaneously touched for a moment against opposite sides of the heated blade 5, and which causes such ends to melt into enlarged, semifluid globules 16. See FIGS. 2 and 6. Before such globules cool and harden, the filament portions are raised above the heated blade 5, and such globules then physically merged together and permitted to cool whereby to form one of the enlarged knobs 15. See the detached fragmentary illustration of FIG. 2. Thus, the knob 15, as so formed, serves as a stop for said flower 14a.

The above-described steps of the method are repeated in progression, or flower by flower, along the filament 12 until a garland of the desired length is produced; the proper spacing of the flowers being assured by the enlarged knobs 15 and which, because of their positioning between such flowers, prevent movement of the latter any appreciable distance on the filament.

While the method is here disclosed as manually performed, it is to be understood that such method can be successfully practiced by an automatic machine.

From the foregoing description, it will be readily seen that there has been produced such a method of producing an ornamental garland as substantially fulfills the objects of the invention, as set forth herein.

I claim:

1. A method of producing a garland comprising the successive steps of stringing an ornamental article on a length of filament, severing the length of filament into two portions at a point beyond such article, the latter remaining on one of said filament portions, threading another ornamental article on the other filament portion, reconnecting the severed ends of the filament portions in a manner to form an enlargement which acts as a stop preventing movement of said other article therepast, and then repeating the aforesaid steps to produce a row of said ornamental articles individually strung on the filament and with adjacent articles maintained in spaced relation by an intermediate enlargement on said filament.

2. A method, as in claim 1, in which the filament is of a material subject to melting under a condition of heat; the severed ends of the filament being reconnected by first heating such severed ends to create semifluid globules, and then merging and cooling said globules whereby to form the enlargement.

3. A method, as in claim 2, in which the filament is a material of the class of nylon monofilament.

4. A method, as in claim 1, in which the ornamental articles are tubular-necked flowers.

5. A method, as in claim 1, in which the filament is a material rendered plastic by heat; the severed ends of the filament being heated to create plastic globules, and said plastic globules then being merged and cooled to provide a weld which reconnects said filament portions and forms said enlargement.

6. A method of producing a garland comprising the successive steps of stringing a tubular-necked flower on a length of filament, severing the length of filament into two portions at a point beyond such flower, the latter remaining on one of said filament portions, threading another tubular-necked flower on the other filament portion, reconnecting the severed ends of the filament portions in a manner to form an enlargement which acts as a stop limiting movement of said other flower in the direction of the first named flower, and then repeating the aforesaid steps to produce a row of said flowers individually strung on the filament and with adjacent flowers maintained in spaced relation by an intermediate enlargement on said filament.

7. A method, as in claim 6, in which the filament is a material rendered plastic by heat; the severed ends of the filament being heated to create plastic globules, and said plastic globules then being merged and cooled to provide a weld which reconnects said filament portions and forms said enlargement.

8. A method, as in claim 7, including the step of shielding at least one of said flowers from the heat to which said severed ends are subjected.

9. A method of producing an ornamental garland which includes a length of filament rendered plastic by heat, a row of ornamental articles strung on the filament, and enlargements on the filament, between adjacent ornamental articles, limiting movement of the latter on said filament; the method being characterized by the inclusion of the steps of creating the enlargements by heating to plastic condition and then reforming portions of the filament.

10. A method of producing an ornamental garland, as in claim 9, in which the ornamental articles of the garland are tubular-necked flowers; the method being characterized by the further step of shielding such flowers from the heating of said portions of the filament.